US007917350B2

(12) United States Patent
Mori et al.

(10) Patent No.: US 7,917,350 B2
(45) Date of Patent: Mar. 29, 2011

(54) WORD BOUNDARY PROBABILITY ESTIMATING, PROBABILISTIC LANGUAGE MODEL BUILDING, KANA-KANJI CONVERTING, AND UNKNOWN WORD MODEL BUILDING

(75) Inventors: Shinsuke Mori, Yokohama (JP); Daisuke Takuma, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 12/126,980

(22) Filed: May 26, 2008

(65) Prior Publication Data
US 2008/0228463 A1 Sep. 18, 2008

Related U.S. Application Data

(63) Continuation of application No. 11/180,153, filed on Jul. 13, 2005, now abandoned.

(30) Foreign Application Priority Data

Jul. 14, 2004 (JP) ................................. 2004-207864

(51) Int. Cl.
G06F 17/28 (2006.01)
G06F 17/20 (2006.01)
G06F 17/27 (2006.01)
G06F 17/21 (2006.01)

(52) U.S. Cl. ........................ 704/2; 704/8; 704/9; 704/10
(58) Field of Classification Search .................. 704/2, 4, 704/9
See application file for complete search history.

(56) References Cited

U.S. PATENT DOCUMENTS

| | | | | |
|---|---|---|---|---|
| 5,806,021 | A * | 9/1998 | Chen et al. | 704/9 |
| 5,987,409 | A | 11/1999 | Tran et al. | |
| 6,092,038 | A * | 7/2000 | Kanevsky et al. | 704/9 |
| 6,185,524 | B1 | 2/2001 | Carus et al. | |
| 6,363,342 | B2 * | 3/2002 | Shaw et al. | 704/220 |
| 6,411,932 | B1 * | 6/2002 | Molnar et al. | 704/260 |
| 6,738,741 | B2 * | 5/2004 | Emam et al. | 704/251 |
| 6,983,248 | B1 * | 1/2006 | Tahara et al. | 704/255 |

(Continued)

OTHER PUBLICATIONS

Luo et al, "An Iterative Algorithm to Build Chinese Language Models", InProc. of the 34th Annual meeting of the Association for Computational Linguistics, pp. 139-143.*

(Continued)

Primary Examiner — Richemond Dorvil
Assistant Examiner — Olujimi A Adesanya
(74) Attorney, Agent, or Firm — Cantor Colburn LLP; Vazken Alexanian (57) ABSTRACT

Calculates a word n-gram probability with high accuracy in a situation where a first corpus), which is a relatively small corpus containing manually segmented word information, and a second corpus, which is a relatively large corpus, are given as a training corpus that is storage containing vast quantities of sample sentences. Vocabulary including contextual information is expanded from words occurring in first corpus of relatively small size to words occurring in second corpus of relatively large size by using a word n-gram probability estimated from an unknown word model and the raw corpus. The first corpus (word-segmented) is used for calculating n-grams and the probability that the word boundary between two adjacent characters will be the boundary of two words (segmentation probability). The second corpus (word-unsegmented), in which probabilistic word boundaries are assigned based on information in the first corpus (word-segmented), is used for calculating a word n-grams.

17 Claims, 7 Drawing Sheets

U.S. PATENT DOCUMENTS

| | | |
|---|---|---|
| 7,349,839 B2 * | 3/2008 | Moore .............................. 704/2 |
| 2002/0111793 A1 | 8/2002 | Luo et al. |
| 2003/0093263 A1 | 5/2003 | Chen et al. |
| 2003/0097252 A1 | 5/2003 | Mackie |
| 2003/0152261 A1 * | 8/2003 | Hiroe et al. ................... 382/153 |
| 2005/0071148 A1 * | 3/2005 | Huang et al. ...................... 704/4 |
| 2005/0091030 A1 * | 4/2005 | Jessee et al. ...................... 704/4 |

OTHER PUBLICATIONS

Nagata, "A stochastic Morphological Analyzer Using a Forward-DP Backward- N-Best Search Algorithm",1994, InProc. COLING'94, pp. 201-207.*

Nagata, "Japanese OCR Error Correction using Character Shape Similarity and Statistical Language Model", 1998, InProc. COLING'98, Montreal, Canada, pp. 922-928.*

Teahan et al, "A Compression-Based Algorithm for Chinese Word Segmentation", 2000, Association for Computational Linguistics, vol. 26, No. 3, pp. 375-393.*

Xue, "Chinese Word Segmentation as Character Tagging", Feb. 2003, Computational Linguistics and Chinese Language Processing, vol. 8, No. 1, pp. 29-48.*

Brent et al, "Chinese Text segmentation with MBDP-!: Making the most of training Corpora", 2001, In Proc. of the ACL 2001, pp. 90-97.*

Lee et al, "Language Model Based Arabic Word Segmentation", Jul. 2003, In Proc. of the 41st Annual meeting of the ACL, pp. 399-406.*

Nagata, Masaaki; "A Self-Organizing Japanese Word Segmenter using Heuristic Word Identification adn Re-Estimation"; 1997; pp. 203-215.

W.J. Teahan and John G. Cleary, 1996; "The Entropy of English usin PPM-Based Models" ; 1996; pp. 53-62.

* cited by examiner

Probability of a word string existing between characters when a character of a particular type is followed by the character of different or the same type

| Succeeding \ Preceding | Kanji | Symbol | Numeric | Hiragana | Katakana | Alphabetic | Punctuation mark |
|---|---|---|---|---|---|---|---|
| Kanji | 0.24955045 | 0.87520766 | 0.54558024 | 0.67322202 | 0.66363625 | 0.99999955 | 1.00000000 |
| Symbol | 0.99647842 | 0.74999980 | 0.54558024 | 0.99999955 | 0.99999955 | 0.99999955 | 1.00000000 |
| Numeric | 0.54558024 | 0.54558024 | 0.54558024 | 0.54558024 | 0.54558024 | 0.54558024 | 1.00000000 |
| Hiragana | 0.97213218 | 0.99999955 | 0.54558024 | 0.46024105 | 0.99999955 | 0.99999955 | 1.00000000 |
| Katakana | 0.90384580 | 0.99999955 | 0.54558024 | 0.99529367 | 0.05458673 | 0.99999955 | 1.00000000 |
| Alphabetic | 0.99999955 | 0.00000055 | 0.54558024 | 0.99999955 | 0.99999955 | 0.00000055 | 1.00000000 |
| Punctuation mark | 1.00000000 | 1.00000000 | 1.00000000 | 1.00000000 | 1.00000000 | 1.00000000 | 1.00000000 |

[Figure 7]

Calculation of word n-gram probability $P(w_n|w_1 w_2 \ldots w_{n-1})$

| Corpus name | Segmentation | Number of characters | Text |
|---|---|---|---|
| A－1 | Segmented | 152,802 | Applicable document |
| B－1 | Unsegmented | 54,620,841 | Newspaper |
| A－2 | Unsegmented | 8,800,306 | Applicable document |
| B－2 | Unsegmented | 8,800,418 | Part of B1 containing the same number of character as in A-2 |

[Figure 10]

| Model | Word perplexity |
|---|---|
| Model A: Word bi-gram | 140.9 |
| Model A': Model A and automatically segmented word bi-gram | 144.3 |
| Model B: Model A and probabilistically segmented word bi-gram | 80.7 |
| Model B': Model A and probabilistically segmented word uni-gram | 86.7 |
| Model C: Model A and probabilistically segmented word bi-gram (proposed use) | 80.5 |
| Model C': Model A and probabilistically segmented word uni-gram | 107.1 |
| Model D: Model A and probabilistically segmented bi-gram | 95.7 |
| Model D': Model A and probabilistically segmented word uni-gram | 106.0 |

[Figure 11]

| Corpus name | Usage | Number of characters | Text |
|---|---|---|---|
| C | Segmented corpus | 4,595,786 | Newspaper and journal |
| D | Unsegmented corpus | 54,415,092 | Newspaper |

[Figure 12]

| Model | precision | recall |
|---|---|---|
| Model A-class bi-gram only | 94.78% | 95.39% |
| Model B: Model A and automatically segmented word uni-gram | 95.59% | 95.75% |
| Model C: Model A and probabilistically segmented word uni-gram | 96.24% | 96.04% |

WORD BOUNDARY PROBABILITY ESTIMATING, PROBABILISTIC LANGUAGE MODEL BUILDING, KANA-KANJI CONVERTING, AND UNKNOWN WORD MODEL BUILDING

CROSS-REFERENCE TO RELATED APPLICATIONS

This is a continuation of U.S. application Ser. No. 11/180, 153, entitled "Word boundary probability estimating, probabilistic language model building, kana-kanji converting, and unknown word model building", filed Jul. 13, 2005, which claims priority from Japanese application number JP2004-207864, filed Jul. 14, 2004, all of which are incorporated herein by reference.

FIELD OF THE INVENTION

The present invention relates to recognition technology in natural language processing, and improving the accuracy of recognition in natural language processing by using a corpus, in particular by effectively using a corpus to which segmentation is not applied.

BACKGROUND ART

Along with the progress of recognition technology for natural language, various techniques, including kana-kanji conversion, spelling checking (character error correction), OCR, and speech recognition techniques, have achieved a practical-level predication capability. At present, most of the methods for implementing these techniques with high accuracy are based on probabilistic language models and/or statistical language models. Probabilistic language models are based on the frequency of occurrence of words or characters and require a collection of a huge number of texts (corpus) in an application field.

The following documents are considered:

[Non-patent Document 1] "Natural Language Processing: Fundamentals and applications", edited by Hozumi Tanaka, 1999, Institute of Electronics, Information and Communication Engineers

[Non-patent Document 2] W. J. Teahan, and John G. Cleary, 1996, "The entropy of English using ppm-based models", In DCC.

[Non-patent Document 3] Leo Breiman, Jerome H. Friedman, Richard A. Olshen, and Chales J. Stone, 1984, Classification and Regression Trees, Chapman & Hall, Inc.

[Non-patent Document 4] Masaaki Nagata, "A Self-Organizing Japanese Word Segmenter using Heuristic Word Identification and Re-estimation", 1997

In most speech recognition systems, the most probable character string is selected from among a number of candidates by referring to a probabilistic language model as well as an acoustic model. In spell checking (character error correction), unnatural character strings and their correction candidates are listed based on the likelihood of a probabilistic language model.

Because a practical model treats a word as a unit, it is required that a corpus be provided with information about word boundaries. In order to determine word boundaries, an operation such as segmentation or tagging is performed.

Automatic word segmentation methods have been already known. However, the existing automatic word segmentation systems provide low accuracies in fields such as the medical field, where many technical terms are used. To manually correct the results of automatic word segmentation, the operator needs to have knowledge of technical terms in the application field, and typically, a minimum of tens of thousands sentences are required in order to achieve recognition sufficiently accurate enough for practical use.

In training using a corpus in an application field, it is generally difficult to obtain a huge corpus segmented and tagged manually for the application field, taking much time and cost and thus making it difficult to develop a system in a short period.

Although information segmented into words in a field (for example in the medical field) may works in processing the language in that field, there is no assurance that the information will work also in another application field (for example in the economic field, which is completely different from the medical field). In other words, a correct corpus segmented and tagged in a field may be definitely correct in that field, but may not necessarily correct in other fields because the segmented and/or tagged corpus has been fixed by segmentation and/or tagging.

In this regard, there are many techniques in the background art that are pursuing efficiency and accuracy in word segmentation in Asian languages. However, all of these techniques are aiming to predetermine word boundaries in word segmentation fixedly.

Taking Japanese out of the Asian languages as an example, word information required for analyzing Japanese text relates to the structure of word spelling, which is the information regarding the character configuration (representation form) and pronunciation of entry words, including "spelling information", "pronunciation information", and "morphological information". These items of information may provide important clues mainly in extracting candidate words from Japanese text in morphological analysis.

Although there is no clear definition of the term "word", attention is directed to two elements of the "word" herein, "spelling" and "pronunciation" and two words are regarded as the same words if and only if they have the same spelling (characters) and pronunciation. Isomorphic words just having the same spelling (characters) or homophonic words just having the same pronunciation are regarded as different words. The spelling of a word is involved in identifying a morphological characteristic and the pronunciation is involved in identifying a phonemic characteristic.

Hence, the Japanese words composed of two Chinese characters "記者"(reporter), "汽車"(train), "帰社"(return to the office), and "喜捨"(charity) all have the same pronunciation "きしゃ"(kisha) but different spellings (characters), whereby they are different words. The "word" is symbolized in the computer, in which the correspondence between the symbol as the spelling (character) and the symbol as its meaning is registered. Japanese is one kind of agglutinative language, and has an extremely high word formation power, whereby care must be taken in registering words in the computer as "dictionary". The pronunciation is given in a string of input symbols (e.g., katakana in Japanese, Roman character representation of katakana) in the computer.

A word is registered in the computer by a method of registering all the possible spellings (characters), or collecting and registering the spellings having high use frequency, a method of registering only typical spellings, and searching for a word in combination with its pronunciation, or a method of providing various sorts of character conversion table apart from the dictionary and investigating the correspondence with headwords, or a combination of these methods.

A plain example for correcting the result of automatic word segmentation is given below. For example, for the pronunciation of "はきもの"(ha-ki-mo-no), there are two corresponding spellings. One is the word "履物"(footwear) and the other is a sequence of two words "は"(postpositional particle) and "着物"(kimono). These two spellings are associated with the pronunciation "ha-ki-mo-no". If there is an occurrence of this pronunciation and the spelling resulting from word segmentation is considered to be improper, the spelling is corrected by re-segmenting. Unlike English, Japanese language does not have a space between words (write with a space between words), therefore an expert must determine word boundaries from the context around an sample sentence, based on the knowledge of technical terms.

As an example indicates that the word "履物"(footwear) is assigned to the pronunciation "はきもの"(ha-ki-mo-no), it will be found that the word needs to be correctly recognized using the knowledge of vocabulary. Therefore, there is a demand for a method for increasing the accuracy, making effective use of the corpus without segmentation.

For all processes in natural language processing, conversion of character strings or speech data into a string of morphemes is a prerequisite. However, in Asian languages such as Japanese, it is difficult to morphologically analyze even written text because, unlike English text, text in such languages is written without a space between words. Therefore, as part of the accuracy problem described above, there is the need for accurately obtaining candidate morpheme strings (x) when input data (y) such as a hiragana character string, a katakana character string, or speech data is given.

In a statistical approach, this can be formulated as the maximization problem of P(x|y) and Bayes' theorem can be used to decompose it into two models of maximizing, P(y|x) and P(x), as shown in the right-hand side of the equation $$P(x|Y)=P(y|x)/P(x)/P(y)$$

where P(y) is a constant as y is given. The model of P(x) is independent of the type of input data (whether it is a symbol string, character string, or speech data), hence called a "language model". One of the most commonly used probabilistic language models is a word n-gram model.

<Conventional Art Relating to the Use of Unsegmented Corpus>

As conventional art there are methods in which the result of segmentation of an unsegmented corpus based on training with a segmented corpus is used:

(a) Counting n-grams with weight by using candidate segmentations,
(b) Using only 1-best of the candidates resulting from automatic segmentation, and
(c) Using n-best of the candidates resulting from automatic segmentation.

However, methods (a) and (c) require high computational costs for bi-gram and higher and are unrealistic. Advantages of the present invention over method (b) will be described later with respect to experiments.

SUMMARY OF THE INVENTION

In light of the foregoing, a general aspect of the present invention can be summarized as follows. The invention provides that a word n-gram probability is calculated with high accuracy in a situation where:

(a) a first corpus (word-segmented), which is a relatively small corpus containing manually segmented word information, and
(b) a second corpus (word-unsegmented), which is a relatively large corpus containing raw information are given as a training corpus that is storage containing vast quantities of sample sentences.

Vocabulary including contextual information is expanded from words occurring in the first corpus (word-segmented) of relatively small size to words occurring in the second corpus (word-unsegmented) of relatively large size by using a word n-gram probability estimated from an unknown word model and the raw corpus.

<Usage of Word Segmented Corpus>

A first corpus (word-segmented) is used for calculating n-grams and the probability that the boundary between two adjacent characters will be the boundary of two words (segmentation probability). A second corpus (word-unsegmented), in which probabilistic word boundaries are assigned based on information in the first corpus (word-segmented), is used for calculating a word n-gram.

<Calculation of Probabilistic Word Boundaries>

In the second corpus (word-unsegmented), the segmentation probability calculated from the first corpus (word-segmented) is assigned between characters.

<Character-Wise Unknown-Word Model>

The correspondences between each character and its pronunciations are modeled. Thereby, a kana-kanji conversion model for an unknown word is proposed.

Advantages of the invention include that with a word boundary probability estimating device, a probabilistic language model building device, a kana-kanji converting device, and a method therefor according to the present invention as described above, existing vocabulary/linguistic models concerning the first corpus (word-segmented) are combined with vocabulary/linguistic models built by probabilistically segmenting the second corpus (word-unsegmented), which is a raw corpus, whereby the accuracy of recognition in natural language processing can be improved. Because the capability of a probabilistic language model can be improved simply by collecting sample sentences in a field of interest, application of the present invention to fields for which language recognition technique corpuses not provided can be supported.

BRIEF DESCRIPTION OF THE DRAWINGS

For a more complete understanding of the present invention and the advantages thereof, reference is now made to the following description taken in conjunction with the accompanying drawings, in which.

DESCRIPTION OF SYMBOLS

1 . . . Kana-kanji converting device
10 . . . CPU
12 . . . Input device
14 . . . Display device
16 . . . Storage device
18 . . . Recording medium
2 . . . Kana-kanji conversion program
22 . . . Language decoding section
30 . . . Base form pool
300 . . . Vocabulary dictionary
302 . . . Character dictionary
32 . . . Language model
320 . . . First corpus (word-segmented)
322 . . . Second corpus (word-unsegmented)

DETAILED DESCRIPTION OF THE INVENTION

The present invention provides that a word n-gram probability is calculated with high accuracy in a situation where:

(a) a first corpus (word-segmented), which is a relatively small corpus containing manually segmented word information, and (b) a second corpus (word-unsegmented), which is a relatively large corpus containing raw information are given as a training corpus that is storage containing vast quantities of sample sentences.

Vocabulary including contextual information is expanded from words occurring in the first corpus (word-segmented) of relatively small size to words occurring in the second corpus (word-unsegmented) of relatively large size by using a word n-gram probability estimated from an unknown word model and the raw corpus.

<Usage of Word Segmented Corpus>

The first corpus (word-segmented) is used for calculating n-grams and the probability that the boundary between two adjacent characters will be the boundary of two words (segmentation probability). The second corpus (word-unsegmented), in which probabilistic word boundaries are assigned based on information in the first corpus (word-segmented), is used for calculating a word n-gram.

<Calculation of Probabilistic Word Boundaries>

In the second corpus (word-unsegmented), the segmentation probability calculated from the first corpus (word-segmented) is assigned between characters.

<Character-Wise Unknown-Word Model>

The correspondences between each character and its pronunciations are modeled. Thereby, a kana-kanji conversion model for an unknown word is proposed.

Thus, with a word boundary probability estimating device, a probabilistic language model building device, a kana-kanji converting device, and a method therefor according to the present invention as described above, existing vocabulary/linguistic models concerning the first corpus (word-segmented) are combined with vocabulary/linguistic models built by probabilistically segmenting the second corpus (word-unsegmented), which is a raw corpus, whereby the accuracy of recognition in natural language processing can be improved. Because the capability of a probabilistic language model can be improved simply by collecting sample sentences in a field of interest, application of the present invention to fields for which language recognition technique corpuses not provided can be supported.

Furthermore, even for words that do not appear in the first corpus (word-segmented), candidates can be listed by referring to character-wise frequency information. Moreover, if the word n-gram probability of the second corpus (word-unsegmented) is used, which is a raw corpus, contextual information about unknown words can be used as well.

The following is an example of an advantageous embodiment:

(Operation of Kana-Kanji Converting Device)

Operation of a kana-kanji converting device 1 (in FIGS. 1 and 2) to which the present invention can be applied will be described below.

(Kana-Kanji Converting Device 1)

Figure 1:
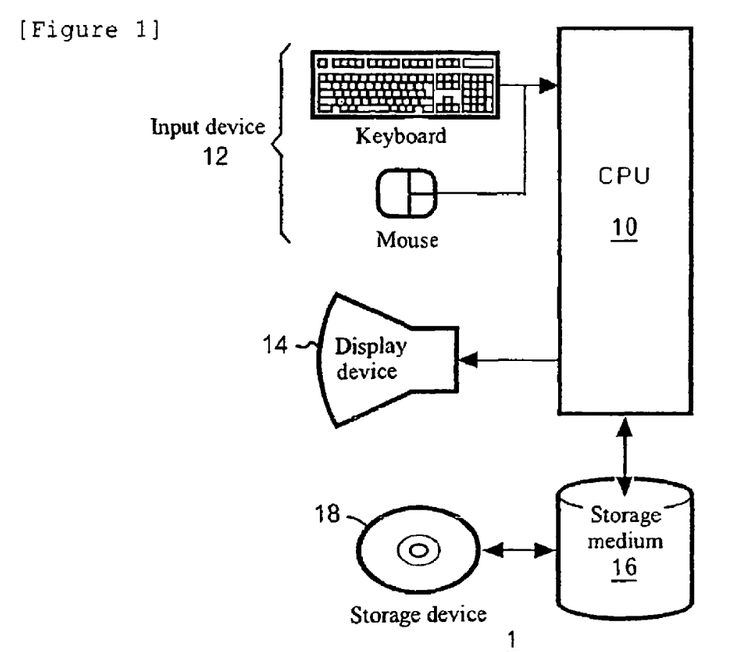
FIG. 1 illustrates a configuration of a kana-kanji converting device according to the present invention.

A kana-kanji converting device 1 to which the present invention can be applied will be described below. FIG. 1 illustrates an exemplary configuration of the kana-kanji converting device 1 to which the present invention can be applied. As shown in FIG. 1, the kana-kanji converting device 1 according to the present invention includes a CPU 10 including a microprocessor, memory, their peripheral circuits, and the like (not shown), input device 12 such as a mouse and a keyboard, a display device 14 such as a CRT display, and a storage device 16 such as an HDD drive, a DVD drive, and a CD drive.

That is, the kana-kanji converting device 1 has a typical hardware configuration, executes a kana-kanji conversion program 2 (which will be described later with reference to FIG. 2), which is supplied in the form of a program recorded on a recording medium 18, such as a DVD, CD-ROM, or CD-RAM, converts input symbols strings which are input from the keyboard 120 in the input devices 12 and converted into a digital format to create text data, and records the text data on a recording medium 18 placed in the storage device 16 or display the text data on the display device 14. The kana-kanji converting device can be construed as a smaller unit than the kana-kanji converting device, such as a word boundary probability estimating device, and a probabilistic language model building device (see FIG. 4). The same applies to cases where the kana-kanji device is construed as being in the categories of method and program.

(Kana-Kanji Conversion Program 2)

Figure 2:
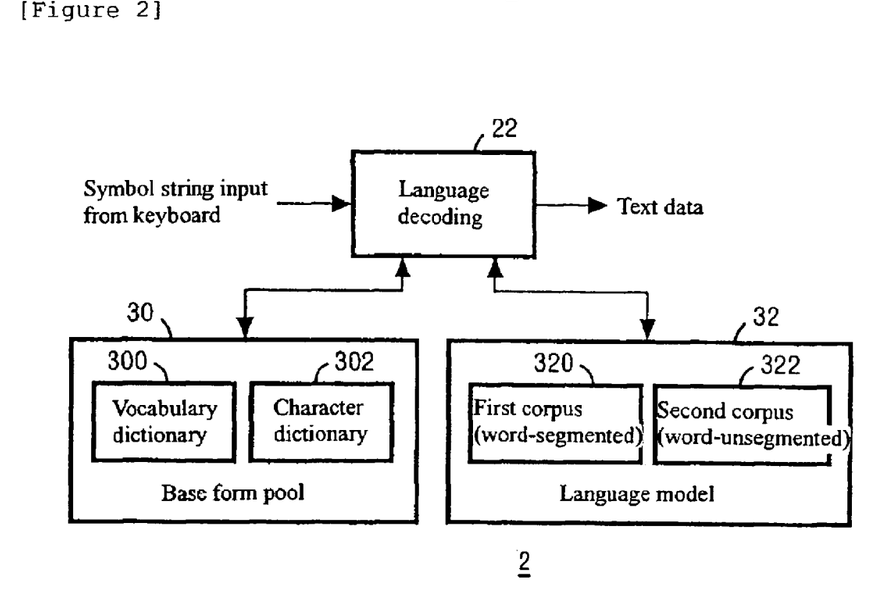
FIG. 2 shows a configuration of a kana-kanji converting device and a kana-kanji conversion program that implement a kana-kanji conversion method according to the present invention.

FIG. 2 shows a configuration of a kana-kanji conversion program 2 that implement a kana-kanji conversion method to which the present invention can be applied. As shown in FIG. 2, the kana-kanji conversion program 2 includes a language model 32 and a base form pool 30 described above. The language model 32 includes a first corpus (word-segmented) 320 and a second corpus (word-unsegmented) 322. The kana-kanji conversion program 2 may be stored in the program storage device 16 or may be loaded into a storage device such as a memory (for example, a random access memory) in the CPU 10 (which may be allocated as an array in the program) when being executed.

(Base Form Pool 30)

Stored in the base form pool 30 is a vocabulary dictionary 300 in which the pronunciations of words occurring in the first corpus (word-segmented) are stored correspondingly to the first corpus (word-segmented) 320 of the language model 32. Also, all characters constituting the words and their pronunciations are stored in a character dictionary 302. The character dictionary 302 is sometimes referred to as the single-kanji dictionary.

It is novel to consider combinations of all characters and their pronunciations and associate and store the pronunciations with their occurrence probabilities in the character dictionary. In particular, without this provision, it is impossible to conceive of referring to the occurrence probabilities when applying kana-kanji conversion to a pronunciation.

Figure 3:
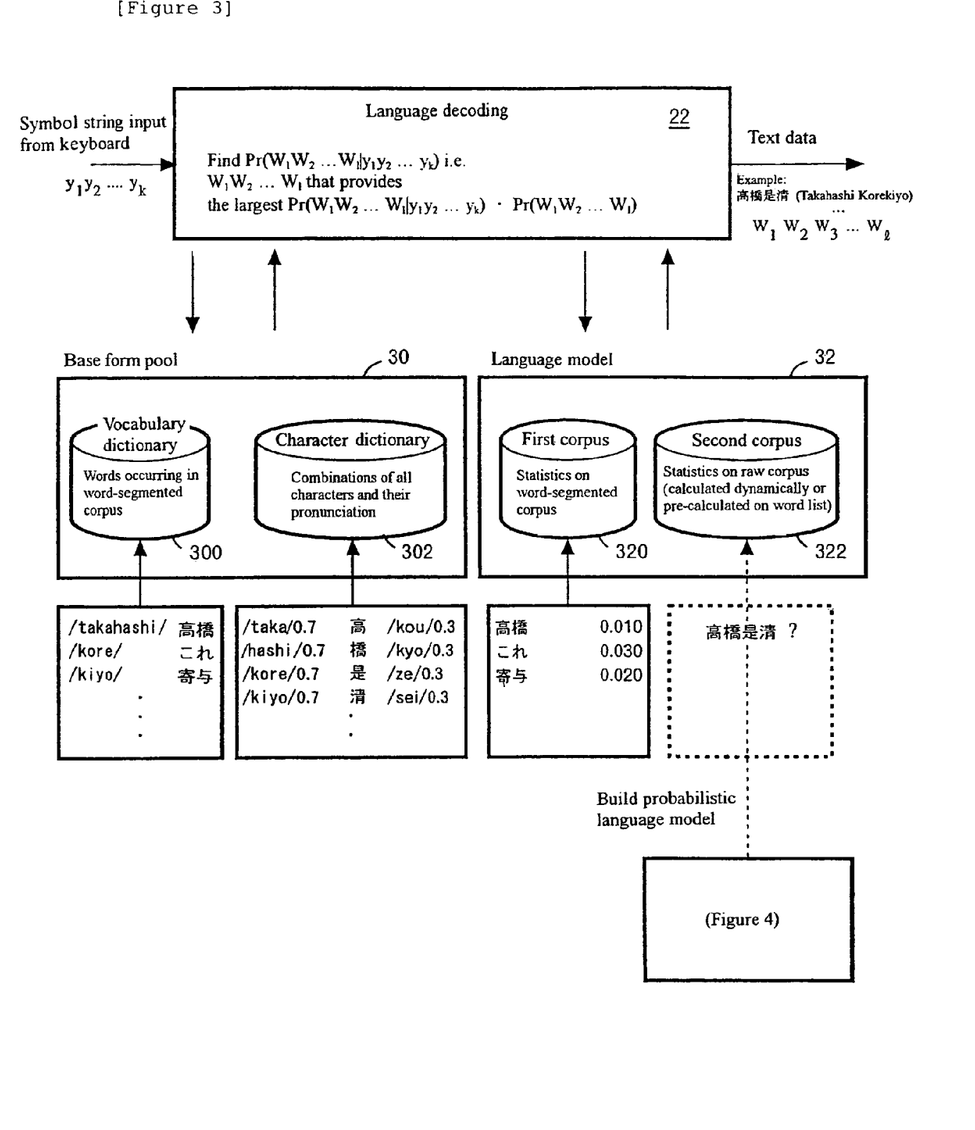
FIG. 3 shows details of the kana-kanji converting device shown in FIG. 2.

FIG. 3 shows the details of the base form pool 30. For example, the pronunciation /takahashi/ is stored for the word /高橋/(Takahashi, a family name) in the vocabulary dictionary 300, the pronunciation /kore/ is stored for the word /これ/(this), and the pronunciation /kiyo/ is stored for the word /寄与/(contribution). These are stored as already segmented words.

If this vocabulary dictionary is provided correspondingly to the first corpus (word-segmented), statistics on the probabilities of occurrence (the likelihood that each word will appear) can be readily taken like this: the probability that the word /高橋/will appear in the first corpus (word-segmented) is 0.010, the probably that /これ/will appear is 0.0300, and the probability that /寄与/will appear is 0.020. While the probability of occurrence is shown as being stored in the first corpus (word-segmented) 320 in FIG. 3, the storage location is not limited to the example shown in FIG. 3, provided that it is associated with the first corpus (word-segmented).

Stored in the character dictionary 302 are combinations of all pronunciations of characters. For example, for the spelling of the character /高/, combinations of all of its pronunciations, including /taka/ and /kou/, are stored; and for the spelling of the character /橋/, combinations of all of its pronunciations, including /hashi/ and /kyou/, are stored.

Also stored in the character dictionary 302 is a table containing the probabilities of occurrence of pronunciations associated with characters. A 0.7 probability of /taka/occurring and a 0.3 probability of /kou/ occurring are contained in association with the spelling of the character /高/, a 0.7 probability of /hashi/ occurring and a 0.3 probability of /kyou/ occurring are contained in association with the spelling of the character /橋/, and a 0.7 probability of /kore/ occurring and 0.3 probability of /ze/ occurring are contained in association with the spelling of the character /是/, and 0.7 probability of /kiyo/ occurring and a 0.3 probability of /sei/ occurring are contained in association with the spelling of the character /清/.

These probabilities of occurrence may not necessarily be included in the character dictionary 302. They may be stored in a location separate from the character dictionary 302, provided that correspondences between all the pronunciations and characters are described. In this way, a character-wise unknown-word model is built. Building of the character-wise unknown-word model allows listing of candidates by referring to the occurrence probabilities (frequency information) This is summed in FIG. 4 and will be described later.

(First Corpus (Word-Segmented) 320)

Details of the first corpus are shown in FIG. 3. Stored in the first corpus (word-segmented) 320 are character strings made up of a number of characters.

(Second Corpus (Word-Unsegmented) 322)

Details of the second corpus are shown in FIG. 3. A word boundary probability estimating device (FIG. 4) calculates the probability of a word boundary existing between characters in the first corpus (word-segmented), refers to the probability, applies it to between characters in the second corpus (word-unsegmented), and estimates the probability of a word boundary existing between them.

Stored in the second corpus (word-unsegmented) 322 are character strings made up of a number of characters. The second corpus (word-unsegmented), which segmentation has not been applied to, is also called the "raw corpus". Because segmentation requires manual correction and therefore is troublesome as described above, it is preferable that the large second corpus (word-unsegmented) of large size can be used effectively.

It should be noted that, while a model including the first corpus (word-segmented) and second corpus (word-unsegmented) is called a language model 32 herein, models, including those stored in the base form pool 30, may be referred to as "languages models" in some places herein. The term "language model" as used herein refers to a storage device in which these items of information.

(Language Decoding Section 22)

A language decoding section 22 decodes an input symbol string into the word string (W' in the expression 2 below) that provides the highest probability calculated using the base form pool 30 and the language model 32 to the display device 14 or the storage device 16, and outputs it as text data to display or store it on the display device 14 or the storage device 16.

Figure 8:
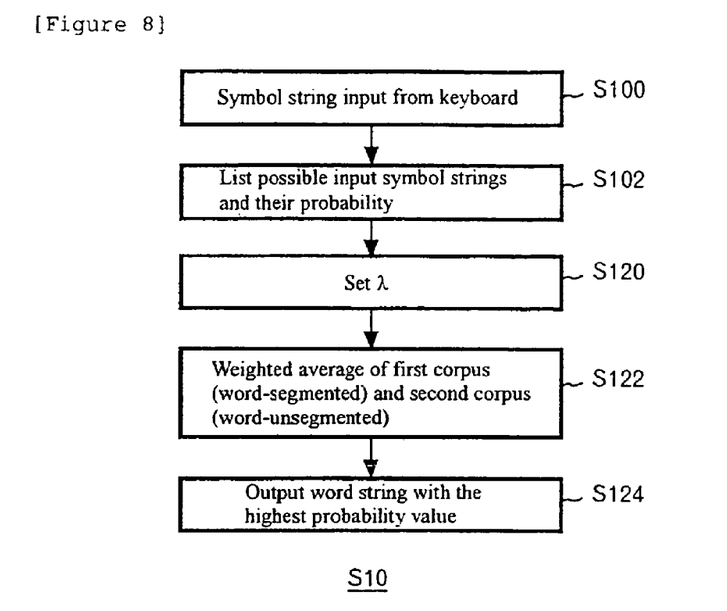
FIG. 8 is a flowchart of an operation of the kana-kanji converting device (language decoding section) shown in FIG. 2 in which the weights of the first corpus (word-segmented) and the second corpus (word-unsegmented) are adjusted with λ.

According to the present invention, the first corpus (word-segmented) and the second corpus (word-unsegmented) can be linearly interpolated (deleted interpolation) according to the following expression 1. This process will be described later with reference to FIG. 8.

$$Pr(w1|w2,w3)=\lambda P1(w1|w2,w3)+(1-\lambda)P2(w1|w2,w3) \quad (1)$$

In the expression, N=3, $0 \leq \lambda \leq 1$, P1 denotes the first corpus (word-segmented), and P2 denotes the second corpus (word-unsegmented).

In the following expression 2, P(Y|W) is given by the base form model 30 and P(W) is given by the language model 32. P(W) can be obtained by calculating a weighted average of the first corpus (word-segmented) 320 and the second corpus (word-unsegmented) 322 according to the value of λ by using the expression 1.

$$W'=\text{argmax } P(W|Y)=\text{argmax } P(Y|W)P(W) \quad (2)$$

where y represents the input symbol string (y1, y2, . . . , yk), W represents the word string (w1, w2, . . . , wl), and W' represents the word string (w'1, w'2, . . . , w'l).

(Calculation of Word Boundary Probability)

A method for calculating the probability that a word boundary will exist in the first corpus (word-segmented) 320 will be described below.

In the first corpus (word-segmented) 320, the character string "言語学を学ぶ。"(Learning linguistics), is stored as sample sentence. The character string is stored as seven characters, "言", "語", "学", "を", "学", "ぶ", and "。". These seven characters are classified into six character types: kanji, symbol, numeric, hiragana, katakana, and alphabetic (characters that cannot be classified into symbol, numeric, nor any of the other character type). The characters in the sequence in the sample sentence can be classified as, "kanji", "kanji," "kanji", "hiragana", "kanji", "hiragana", and "symbol", respectively.

Figure 6:
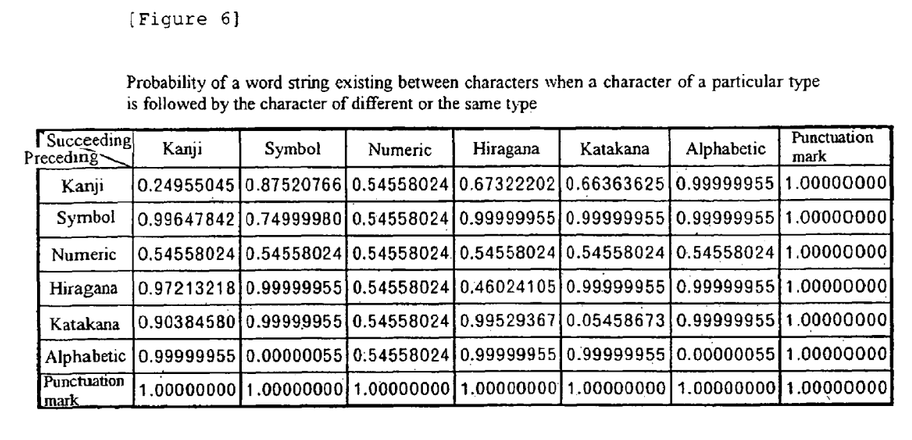
FIG. 6 shows the probability that a word boundary will exist between characters when a character of a particular type is followed by the character of different or the same type.

FIG. 6 shows the probabilities that word boundaries will exist between characters when a character of a particular type is followed by the character of a different or the same type, calculated from the relations in the sequence of the character types in the first corpus (word-segmented) 320. The probability can be readily calculated if information indicating whether a word boundary already exists between characters can be obtained from the first corpus.

However, even if such information cannot obtained from the first corpus, the next calculation can be performed by setting a probability of 0.50000000 is set for the entire corpus as preliminary information concerning whether or not word boundaries will exist. It should be noted that, although this action may result in a lower accuracy, the technical idea of the present invention can be widely applied to such a case.

Furthermore, even if words are not segmented and therefore information as to whether or not word boundaries already exist is not available, a probability of 1.00000000 for sentences the endpoints of which are known.

In FIG. 6, it is indicated that the probability that a word boundary will exist between to kanjis is 0.24955045 if one kanji follows the other kanji. Also, it is indicated that the probability of a word boundary will exist between a kanji and a hiragana that follows the kanji is 0.67322202, the probability of a word boundary will exist between a hiragana and a kanji that follows the hiragana is 0.97213218, and the probability of a word boundary exist between a hiragana and a symbol that follow the hiragana is 0.99999955.

Probabilities closer to 1 are higher (likely) and probabilities closer to 0 are lower (unlikely). If word boundaries are already determined (word boundaries already exist), the two values 0 and 1 would be enough for discriminating whether or not text is segmented into words. It should be noted that intermediate values between 0 and 1 are used for probabilistically showing the degrees of segmentations. Of course, any other method that shows the degree of probability may be used.

(Estimation of the Probability of a Word Boundary Existing)

In the second corpus (word-unsegmented) 322, probabilistic segmentation can be estimated by referring to the probability of a word boundary existing that is calculated from the first corpus (word-segmented) 320.

In one of the simplest examples, it is estimated that the probability of word boundaries obtained in the first corpus (word-segmented) 320 will directly apply to the second corpus (word-unsegmented). In this case, the values obtained in the first corpus (word-segmented) can be used directly as the probabilities of word boundaries existing, though many other reference methods may be used. It should be noted that the term "reference" or "refer" as used herein has broad meaning in terms of usage.

The probabilities of word boundaries existing that are calculated in the first corpus (word-segmented) are assigned between words in the second corpus (word-unsegmented). For example, if the sample sentence "言語学を学ぶ。" occurs in the second corpus (word-unsegmented), the following boundaries are applied to between two characters along with the probabilities shown in the square brackets.

[1] "言"[0.24955045] 語[0.24955045] 学[0.67322202] を[0.971213218] 学[0.67332202] ぶ[1] ○ [1]

This is based on the relations in the sequence of character types shown in FIG. 6.

That is, if the sample sentence "平叙文を読む。" (Reading a declarative sentence.) occurs in the second corpus (word-unsegmented), the following boundaries along with the same probabilities shown in the square brackets that have been used above are applied to between two characters.

[1] 平[0.24055045] 叙[0.24955045] 文[0.67332202] を[0.97213218] 読[0.67322202] む[0.99999955] ○ [1]

(Calculation of Word N-Gram Probability)

An n-gram model is a language model for examining how often n character strings or combinations of words will occur in a character string.

If the word segmentation probability (the probability of segmentation between the i-th character and the i+1-th character is represented by Pi) is calculated, the uni-gram of a word w can be calculated as:

$$fr(w) = \sum_{i \in O_1} P_i \left[ \prod_{j=1}^{k-1} (1 - P_{i+j}) \right] P_{i+k}$$

$$O_1 = \{i \mid x_{i+1}^{i+k} = w\}$$

The frequency of the uni-gram in this example can be calculated as follows.

This means that the probability of the word n-gram is calculated. The uni-gram (N=1) probability can be calculated by using the relation between the preceding and succeeding characters of the character constituting the word uni-gram, in the position of its occurrence.

For example, the uni-gram of the word "言語" can be calculated as:

"言語": $1 \times (1-0.24955045) \times (1-0.24955045)$

Furthermore, the uni-gram of the word having the longer character string "言語学" can be calculated as:

"言語学": $1 \times (1-0.24955045) \times (1-0.24955045) \times (1-0.67332202)$

The uni-gram of the word "を学" can be calculated as:

"を学": $0.6733202 \times (1-0.97213218) \times 0.6733202$

However, the expression yields an extremely low value. Accordingly, it can be estimated that the probability of the word "を学" occurring is extremely low, that is, a kanji is unlikely to occur subsequently to a hiragana. This can be understood empirically.

A typical word n-gram probability can be calculated by expanding the above expression. For example bi-gram probability can be calculated as follows:

$$fr(w1 W2) = \sum_{i \in O_2} \left( P_i \left[ \prod_{j=1}^{k-1} (1 - P_{i+j}) \right] P_{i+k} \times \left[ \prod_{j=1}^{l-1} (1 - P_{i+K+j}) \right] P_{i+k+1} \right)$$

$$O_2 = \{i \mid x_{i+1}^{i+k} = w1 \wedge x_{i+K+1}^{i+k+1} = w2\}$$

A method for efficiently calculating the expected frequency of the character string $x_1 x_2 \ldots x_k$ will be described below with reference to FIG. 5.

Figure 5:
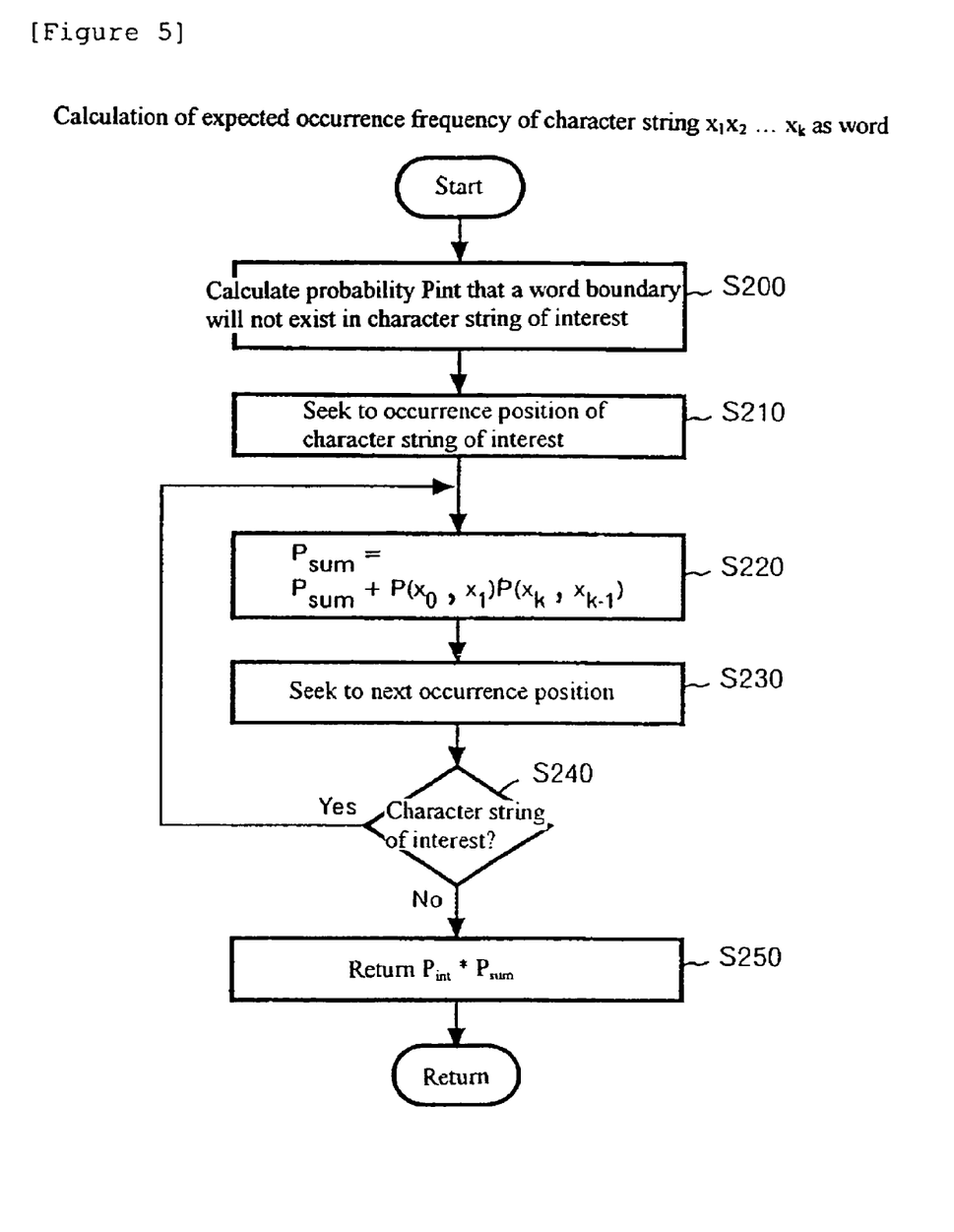
FIG. 5 is a flowchart of a process for calculating the expected frequency of a character string as a word.

FIG. 5 shows a flow chart of a process of calculating the expected frequency of the character string $x_1 x_2 \ldots x_k$ in the second corpus (word-unsegmented) 322. In S200, the probability $P_{int}$ that a word boundary does not exist in the character string of interest can be calculated.

Here, the probability that a word boundary will exist in a character string of interest, "シャ乱Q"(consisting of four characters) will be calculated. This word is a proper noun and contains characters of different types. The word boundary probabilities will be represented on a character-type basis.

The character string of interest "シャ乱Q"consists of four characters of three character types: katakana, katakana, kanji, and alphabetic.

The probability $P_{int}$ that a word boundary does not exist in the character string of interest can be calculated as: (1−0.05458673) (1−0.90384580) (1−0.99999955).

At step S210, the position in the second corpus (word-unsegmented) 322 at which the character string of interest occurs is sought.

For example, suppose that the character string of interest is found as follows:

... はシャ乱Qの ... (where in fact there are other character strings preceding and succeeding the character string of interest, which are represented by the suspension points to show the omission; the same applies to the following description).

A hiragana, "は"precedes the character string of interest and a hiragana "の"succeeds the character string of interest. Accordingly, $P_{sum}$ is calculated as: (1−0.99999955) (1−0.99999955).

At step S230, the next occurrence position of the character string of interest is sought. If at step S240 the character string of interest (a vicinity pattern) is found as ... 「シャ乱Q」..., then the process returns to S220. The symbol "「"precedes the character string of interest and the symbol "」"succeeds the character string of interest.

Accordingly, $P_{sum}$ is calculated as (1−0.99999955) (1−0.99999955) and is added to the $P_{sum}$ calculated above.

Such addition is repeated until the character string of interest is no longer found in the second corpus (word-unsegmented) 322 at S240, then $P_{int} \times P_{sum}$ is calculated finally at S250. In this way, $P_{int}$ and $P_{sum}$ are calculated separately, thereby efficiently calculating the frequency of occurrence of the character string. The calculation process shown in FIG. 5 is called twice in the flow shown in FIG. 7 as a subroutine.

Other methods for calculating the segmentation probability may be used such as methods using a decision tree or PPM. By using these methods, broader range of character strings can be referred to. The technical idea of the present invention is not limited to these. Any other methods can be used that can describe the existence of a word boundary between characters.

Using the word segmentation probabilities, the second corpus (word-unsegmented) 322 can be treated as a corpus in which characters are segmented at a character boundary (between xi and xi+1) with a probability Pi.

All occurrences of the spelling of a word w in a raw corpus is given by $$O_1 = \{i | x_{i+1}^{i+k} = w\}$$

Then, the probabilistic frequency fr of a word w in a raw corpus can be defined as the sum of probabilistic frequencies as follow:

$$fr(w) = \sum_{i \in O_1} P_i \left[ \prod_{j=1}^{k-1} (1 - P_{i+j}) \right] P_{i+k}$$

This shows that fr is the expected frequency of w in the raw corpus.

Therefore, the word uni-gram probability can be represented as:

$$P_r(w) = f_r(w)/f_r(\cdot)$$

where $$f_r(\cdot) = 1 + \sum_{i=1}^{nr-1} P_i$$

Figure 7:
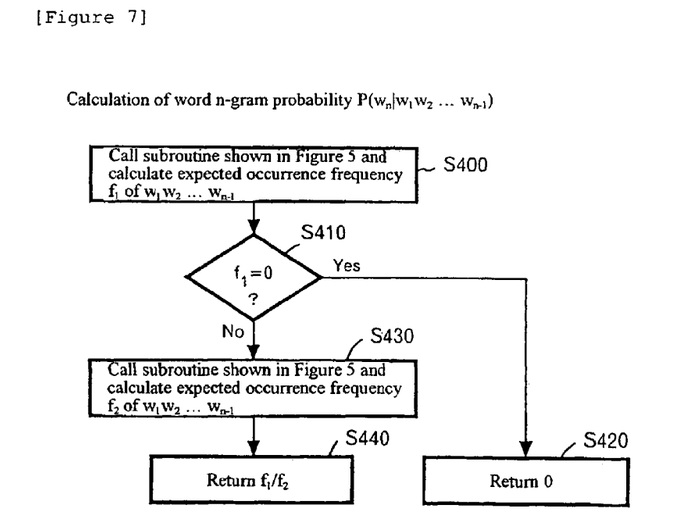
FIG. 7 is a flowchart of a process for calculating word n-gram probability.

FIG. 7 shows a method for calculating the word n-gram probability $P(W_n|W_1, W_2, \ldots, W_{n-1})$. At steps S400 and S430, the subroutine shown in FIG. 5 is called. In the process, f2/f1 is calculated. If f1 is 0, the f2/f1 is indeterminate and therefore 0 is returned at S420. On the other hand, if f1 is not 0, the expected frequency f2 of $W_1, W_2, \ldots, W_n$ is calculated at S430 and f2/f1 is returned at S440.

(Kana-Kanji Conversion Using the Second Corpus (Word-Unsegmented))

The language decoding section 22 refers to both of the vocabulary dictionary 300 and the character dictionary 302 in the base form pool 300. At step S100, the language decoding section 22 receives an input symbols string from the keyboard. At step S102, the language decoding section 22 lists possible input symbol strings and their probabilities. As summarized in FIG. 4, the fact that the probabilistic language model has been built by using the second corpus (word-unsegmented) contributes to the listing of new probabilities for selecting conversion candidates. At step S120, λ is set. At step S122, the language decoding section 22 refers to the first corpus (word-segmented) 320 and the second corpus (word-unsegmented) 322 by assigning weights to them according to the expression 1 given earlier, where λ≠1. At step S124, the language decoding section 22 sequentially outputs the word string with the highest occurrence probability as text data representing the result of the kana-kanji conversion. It should be noted that the word string /高橋是清/can be correctly provided even though it has a probability as low as 0.001. This means that the input symbol string /takahashikorekiyo/ can be correctly converted into the proper noun /高橋是清/even though the input symbol string represents an unknown word.

Figure 4:
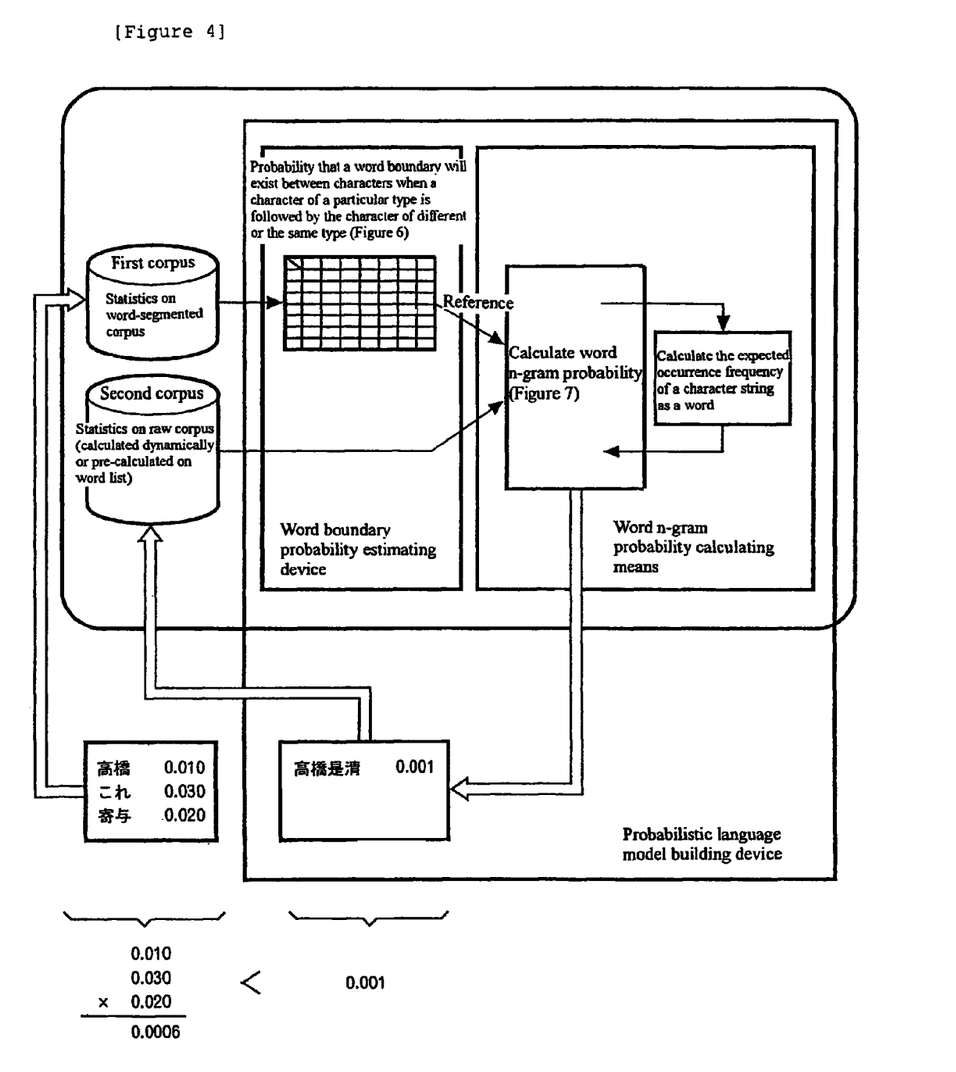
FIG. 4 shows a probabilistic language model building device.

FIG. 4 summarizes the relations. The words /高橋/, /これ/,and /寄与/ occur with probabilities of 0.010, 0.030, and 0.020, respectively, in the first corpus (word-segmented) only. However, the multiplication of these probabilities produces a value of 0.0006, which is the probably of these words being candidates. Because the word string /高橋是清/has a higher probability of 0.001, it is evident that the symbol string was correctly converted.

This is because it can be estimated from the character-wise unknown word model that the character sting "高橋是清"occurs in the second corpus (word-unsegmented) and that the input symbol string /takahashikorekiyo/ corresponds to "高橋是清"with a constant probability of 0.001. If the word string were not correctly provide even with a probability as low as 0.001, it would be incorrectly converted to "高橋 これ 寄与", which is a string of known words with high occurrence frequencies. This is because a sample (bi-gram) in which "是/kore/" is followed by "清/kiyo/" does not occur.

First Experiment

Figure 9:
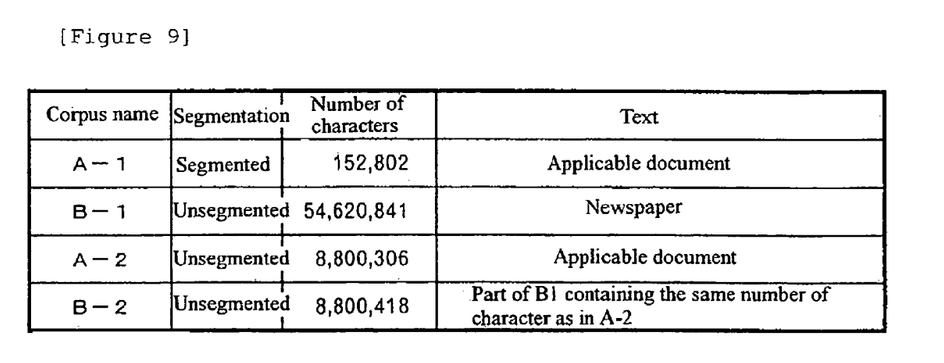
FIG. 9 shows details of the corpuses used in the experiments to demonstrate advantages of introducing the proposed method in writing applicable documents.

Advantages of introducing the proposed method in writing applicable documents will be demonstrated below. FIG. 9 shows details of the corpuses used in the experiment.

Figure 10:
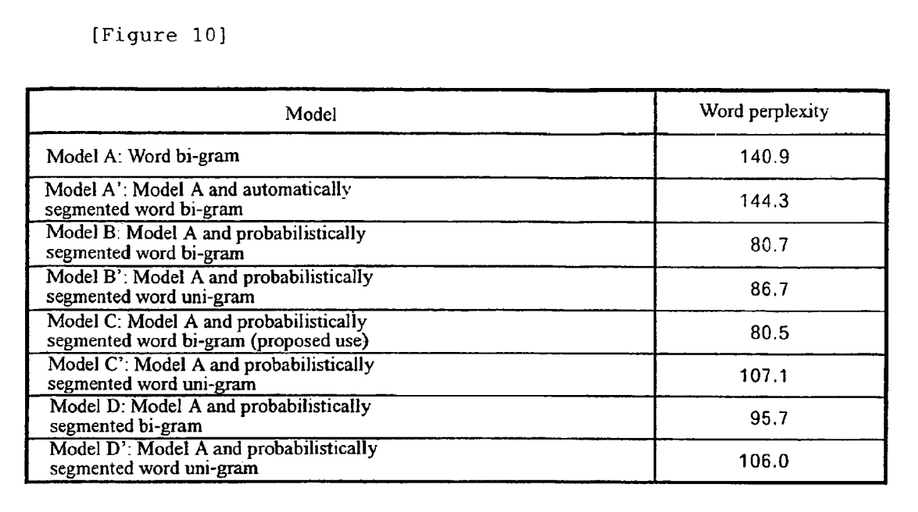
FIG. 10 shows the results of the experiments on the corpuses shown in FIG. 9.

FIG. 10 shows the results of comparative experiments on eight models using the corpuses. Model C represents the proposed method. The testing was conducted using the investigation 323 sentences. Both in the testing and training, documents similarly relating with each other are not include in both of the corpuses.

Comparing with model A, model A', and Model B, it is evident that the accuracy was increased by the introduction of the first corpus (word-segmented). Also, comparing model B with model B', model C with model C', and model D with model D', it can be seen that that the advantage of the models that allow bi-grams or higher order to be calculate.

Furthermore, comparing model C with model D, it can be seen that the proposed method efficiently uses the unsegmented corpus in the application field.

Second Experiment

An experiment was conducted to also calculate the precision and the recall for evaluating the performance of word segmentation. The evaluation is based on the result of kana-kanji conversion of a katakana spelling and the numbers of the characters in the correct longest common subsequence (LCS). Letting the number of the characters contained in a spelling in the first corpus (word-segmented) be $N_C$, the number of the characters contained in the result of kana-kanji conversion be $N_{SYS}$, and the number of the characters in the longest common subsequence be $N_{LCS}$, then the recall can be defied as $N_{LCS}/N_C$ and the precision can be defined as $N_{LCS}/N_{SYS}$.

Figure 11:
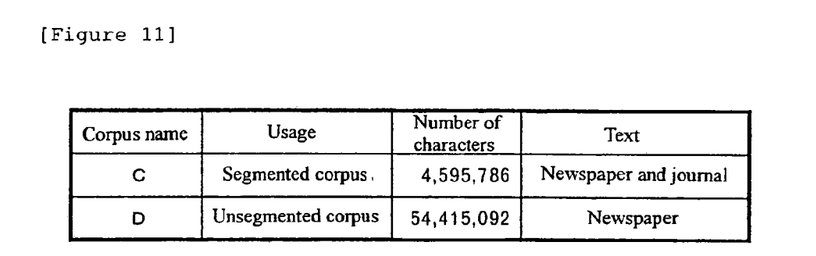
FIG. 11 shows details of the corpuses for calculating the precision and the recall as well for evaluating the performance of word segmentation.
Figure 12:
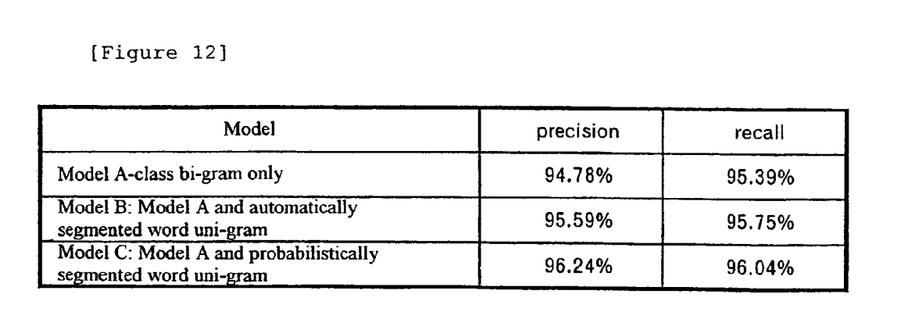
FIG. 12 shows models used in FIG. 11 and the results.

FIG. 11 shows the corpuses used in this experiment. FIG. 12 shows the models used in the experiment and the result. The test was conducted by using 509,261 characters in the EDR corpus. These experiments show that the proposed method (model C) has an advantage over models A and B both in precision and recall.

(Variation)

One may want to use the second corpus (word-unsegmented) more often in some technical fields than in others. A method according to the present invention can readily control this by adjusting the weight in linear interpolation with the first corpus (word-segmented). This is based on the concept that the n-gram probability estimated from the second corpus (word-unsegmented) is less accurate than a language model estimated from a corpus in which words are manually and precisely segmented.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention. Methods may be implemented as signal methods employing signals to implement one or more steps. Signals include those emanating from the Internet, etc.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed, is:

1. A word boundary probability estimating device comprising:

a memory and a processor device;

a first corpus comprising a first character string comprising a plurality of characters, the characters word-segmented manually;

a second corpus, the second corpus larger than the first corpus and comprising a second character string, the second character string comprising a plurality of word-unsegmented characters;

means for calculating a probability that a word boundary exists between each of the plurality of characters in the first character string, the calculating comprising:

determining if a sequence of characters matching the plurality of characters already exists in the first corpus;

determining if a word boundary already exists between the plurality of characters in the first character string in response to determining that a matching sequence exists;

calculating the probability that a word boundary exists in the plurality of characters based on relations in the sequence of character types of successive characters in the first character string in the first corpus by using only the probability of a word boundary already existing between characters of those character types in response to determining that a word boundary already exists between the plurality of characters in the first character string; and using a probability of 0.5 in response to determining that the sequence matching the plurality of characters does not exist in the first corpus; and means for estimating the probability that a word boundary exists in the plurality of non-word-segmented characters in the second corpus by referring to the calculated probability of the boundaries between each of the characters in the characters of the first character string.

2. The word boundary probability estimating device according to claim 1,
wherein the probability that a word boundary exists between the plurality of characters in the first character string is set to 1.0 for known sentence end points.

3. The word boundary probability estimating device according to claim 1,
wherein the calculated probability that a word boundary exists includes values between 0 and 1 capable of probabilistically indicating a degree of segmentation as well as values of 0 and 1 indicating whether or not segmentation is already determined, in order to discriminate whether the first character string including the plurality of characters is segmented or not.

4. The word boundary probability estimating device according to claim 1;
further comprising:
word n-gram probability calculating means for calculating the probability that a word boundary exists on the basis of a relation between a preceding character and a subsequent character at a position of each occurrence of a character string including one or more characters constituting a word n-gram, the probability being a word n-gram probability, and thereby forming a probabilistic language model building device.

5. The word boundary probability estimating device according to claim 1;
further comprising:
word n-gram probability calculating means for calculating the probability that a word boundary exists on the basis of a decision tree in which relations between a plurality of characters constituting a word n-gram are described or on the basis of Prediction by Partial Match (PPM), the probability being a word n-gram probability, and thereby forming a probabilistic language model building device.

6. The word boundary probability estimating device according to claim 4; further comprising:
the first character string which is segmented into at least two words each word including one or more characters, and storing an occurrence probability indicating a likelihood of an occurrence of each of the segmented words in association with the segmented word;
the second character string further comprising a word n-gram probability calculated by the probabilistic language model building device;

a vocabulary dictionary storing, correspondingly to the first corpus, pronunciations associated with each of words segmented as known words;

a character dictionary storing, correspondingly to the first corpus, a pronunciation and spelling of each character in a plurality of conversion candidates that can be converted from an unknown word in association with each other so that that the plurality of conversion candidates can be listed for the unknown word, and storing the occurrence probability of a pronunciation of each character; and a language decoding section converting a input spelling into a conversion candidate by referring to the occurrence probabilities associated with each word stored in the first corpus and the occurrence probabilities of pronunciations of each character stored in the character dictionary, and the word n-gram probability stored in the second corpus for an input pronunciation, and thereby forming a kana-kanji converting device.

7. A word boundary probability estimating method comprising the steps of:
calculating, on a computer processor, a probability that a word boundary exists between each of a plurality of characters in a first character string stored in a first corpus, the calculating comprising:
determining if a sequence of characters matching the plurality of characters already exists in the first corpus;
determining if a word boundary already exists between the plurality of characters in the first character string in response to determining that a matching sequence exists;
calculating the probability that a word boundary exists in the plurality of characters based on relations in the sequence of character types of successive characters in the first character string in the first corpus by using only the probability of a word boundary already existing between characters of those character types in response to determining that a word boundary already exists between the plurality of characters in the first character string; and
using a probability of 0.5 in response to determining that the sequence matching the plurality of character does not exist in the first corpus; and
estimating, on a computer processor, the probability that a word boundary will exist in a plurality of non-word-segmented characters stored in a second corpus by referring to the calculated probability of the boundaries between each of the plurality of characters in the first character string.

8. The word boundary probability estimating method according to claim 7,
wherein the step of calculating the probability that a word boundary exists between each of a plurality of characters is set to 1.0 for known sentence end points.

9. The word boundary probability estimating method according to claim 7,
wherein the calculated probability that a word boundary exists includes values between 0 and 1 capable of probabilistically indicating a degree of segmentation as well as values of 0 and 1 indicating whether or not segmentation is already determined, in order to discriminate whether the first character string including the plurality of characters is segmented or not.

10. The word boundary probability estimating method according to claim 7, further comprising the step of calculating the probability that a word boundary exists on the basis of a relation between a preceding character and a subsequent character at a position of each occurrence of a character string including at least one character constituting a word n-gram, the probability being a word n-gram probability, thereby constituting a probabilistic language model building method.

11. The word boundary probability estimating method according to claim 7, further comprising the step of calculating the probability that a word boundary exists on the basis of a decision tree in which relations between a plurality of characters constituting a word n-gram are described or on the basis of Prediction by Partial Match (PPM), the probability being a word n-gram probability, thereby constituting a probabilistic language model building method.

12. The word boundary probability estimating method according to claim 10, further comprising the steps of:
  referring to the first character string which is segmented into at least two words each word including at least one character, and storing an occurrence probability indicating a likelihood of an occurrence of each of the segmented words in association with the segmented word;
  referring the second corpus further storing a word n-gram probability calculated by the probabilistic language model building device according to a probabilistic language model building method;
  referring to a vocabulary dictionary storing, correspondingly to the first corpus, pronunciations associated with each of words segmented as known words;
  referring to a character dictionary storing, correspondingly to the first corpus, pronunciations and spelling of each character in a plurality of conversion candidates that can be converted from an unknown word in association with each other so that that the plurality of conversion candidates can be listed for the unknown word and storing the occurrence probability of a pronunciation of each character; and
  converting a input spelling into a conversion candidate by referring to the occurrence probabilities associated with each word stored in the first corpus and the occurrence probabilities of pronunciations of each character stored in the character dictionary, and the word n-gram probability stored in the second corpus for an input pronunciation, thereby forming a kana-kanji conversion method.

13. The word boundary probability estimating method according to claim 11, further comprising the steps of:
  referring to the character string which is segmented into at least two words each word including at least one character, and storing an occurrence probability indicating the likelihood of occurrence of each of the segmented words in association with the segmented word;
  referring to the second corpus further storing a word n-gram probability calculated by a probabilistic language model building device according to the probabilistic language model building method;
  referring to a vocabulary dictionary storing, correspondingly to the first corpus, pronunciations associated with each of words segmented as known words;
  referring to a character dictionary storing, correspondingly to the first corpus, pronunciations and spelling of each character in a plurality of conversion candidates that can be converted from an unknown word in association with each other so that that the plurality of conversion candidates can be listed for the unknown word and storing the occurrence probability of a pronunciation of each character; and
  converting a input spelling into a conversion candidate by referring to the occurrence probabilities associated with each word stored in the first corpus and the occurrence probabilities of pronunciations of each character stored in the character dictionary, and the word n-gram probability stored in the second corpus for an input pronunciation, thereby forming a kana-kanji conversion method.

14. The word boundary probability estimating device according to claim 5;
  further comprising:
    the first character string which is segmented into at least two words each word including at least one character, and storing an occurrence probability indicating a likelihood of occurrence of each of the segmented words in association with the segmented word;
    the second corpus storing a character string including a plurality of characters and a word n-gram probability calculated by the probabilistic language model building device;
    a vocabulary dictionary storing, correspondingly to the first corpus, pronunciations associated with each of words segmented as known words;
    a character dictionary storing, correspondingly to the first corpus, a pronunciation and spelling of each character in a plurality of conversion candidates that can be converted from an unknown word in association with each other so that that the plurality of conversion candidates can be listed for the unknown word, and storing the occurrence probability of a pronunciation of each character; and
    a language decoding section converting a input spelling into a conversion candidate by referring to the occurrence probabilities associated with each word stored in the first corpus and the occurrence probabilities of pronunciations of each character stored in the character dictionary, and the word n-gram probability stored in the second corpus for an input pronunciation, and thereby forming a kana-kanji converting device.

15. An article of manufacture for word boundary probability estimating comprising:
  a memory device storing the article of manufacture;
  a computer processor; and
  an application executing on the computer processor, the application executing the method steps of claim 7.

16. A non-transitory computer readable storage device comprising computer executable instructions tangibly embodied on a computer readable medium that when executed by said computer perform a method for word boundary probability estimating, the method comprising the steps of claim 7.

17. A non-transitory computer readable storage device comprising computer executable instructions tangibly embodied on a computer readable medium that when executed by said computer perform a method for word boundary probability estimating, the method comprising the steps of claim 12.

* * * * *